United States Patent Office 3,686,138
Patented Aug. 22, 1972

3,686,138
PRODUCTION OF ATTRITION RESISTANT SOLID CATALYSTS CONTAINING ANTIMONY OXIDE SUITABLE FOR USE IN A FLUIDIZED BED REACTION
Takachika Yoshino, Kanagawa, Shigeru Saito, Tokyo, and Yutaka Sasaki and Yoshimi Nakamura, Kanagawa, Japan, assignors to Nitto Chemical Industry Co., Ltd., Tokyo, Japan
No Drawing. Filed Nov. 3, 1969, Ser. No. 873,709
Claims priority, application Japan, Nov. 2, 1968, 43/79,619
The portion of the term of the patent subsequent to Apr. 18, 1989, has been disclaimed
Int. Cl. B01j 11/06, 11/32, 11/40
U.S. Cl. 252—456
27 Claims

ABSTRACT OF THE DISCLOSURE

Process for preparing an attrition resistant solid catalyst containing antimony oxide, suitable for use in a fluidized bed, essentially comprising the heat treatment of a slurry containing a pentavalent antimony compound, a polyvalent metal compound and a silica sol.

BACKGROUND OF THE INVENTION (1) Field of the invention

The present invention relates to the production of solid catalysts containing antimony oxide and having good mechanical strength. More particularly, it relates to a process for preparing a good, attrition resistant, solid catalyst containing antimony oxide, suitable for use in fluidized bed reactions.

(2) Description of the prior art

It is well known to those skilled in the art that polyvalent metal oxide-antimony oxide system catalysts are useful for the oxidation of olefins to corresponding aldehydes or diolefins and for the ammoxidation of olefins to corresponding nitriles. For instance, iron (or copper or nickel)-antimony, uranium-antimony, tin-antimony, chromium (or copper, manganese, or titanium)-antimony and manganese-antimony catalyst systems are known to be useful catalysts for the oxidation and ammoxidation of olefins, especially for the ammoxidation of propylene to acrylonitrile. Such catalysts are disclosed, for example, in Japanese Pat. No. 420,264, U.S. Pat. No. 3,197,419, U.S. Pat. No. 3,198,750, U.S. Pat. No. 3,152,170, U.S. Pat. No. 3,200,081, and British Pat. No. 987,960.

It is desirable to calcine such catalysts for the purposes of the activation thereof at an elevated temperature of from about 400° C. to 1,000° C. in an oxidizing atmosphere, for example, in air. However, it has been found that such catalysts, when activated by this method, are extremely soft, possessing little strength. Further, it has also been found that the above defect cannot be overcome, even by the incorporation, prior to the high temperature calcination, of a catalyst carrier or support such as silica sol in the mass of starting materials from which the desired catalyst is to be prepared, since the resulting catalyst thus prepared still possesses little attrition resistance.

Methods to avoid the above-mentioned disadvantages have been proposed in the past. For example, in accordance with the teachings of British Pat. No. 1,018,334, the aforesaid disadvantages are considered to be caused by the lattice expansion of the catalyst components during the course of high temperature calcination, and are therefore believed to be effectively eliminated by employing a combination of two operational steps, that is, first pulverizing a catalyst which has previously been produced in accordance with any suitable catalyst preparation process including an activation at an elevated temperature, into fine powder, and secondly, subjecting the catalyst, after reshaping by mixing the aforesaid fine powder with silica sol and drying the resulting mixture, to a final calcination. This combination of steps, however, is somewhat complicated since the catalyst preparation step has to be repeated twice, which is very uneconomical. In addition to this, the degree of pulverization must be carefully controlled, since satisfactory mechanical strength varies depending on the degree of pulverization practiced.

On the other hand, British Pat. No. 1,045,789 teaches the foregoing defects to be inevitable irrespective of the process of preparing the catalyst, and in order to overcome such defects, proposes maintaining the particle sizes of finely powdered catalyst at a constant level during the reaction by causing the powdered catalyst introduced into a fluidized bed reactor to fluidize therein under the effect of a fluidizing gas stream having a high linear velocity between 40 and 130 cm./sec. However, this method does not directly improve the attrition resistance of the catalyst, but only maintains the particle sizes of the powdery catalyst in equilibrium at a constant level by repeated disintegration and reconstitution thereof in the fluidized bed. Accordingly, it may reasonably be concluded that the above procedure must always be executed within a reaction system in situ, resulting in the limitation that the reaction must be carried out under specific conditions with respect to the linear velocity of the fluidizing gas, viz., at a particularly high linear velocity, which causes large losses of the catalyst.

In accordance with the present invention, the above limitations are overcome, and it is possible to produce, in a single catalyst preparation process, a catalyst having a sufficient degree of attrition resistance to be used in a fluidized reactor. The results obtained by the process of this invention is surprising, since it has, up to now, been thought to be impossible to produce a catalyst containing antimony oxide free from fragility in a single catalyst preparation process.

SUMMARY OF THE INVENTION

The present invention provides a process for the preparation of an attrition resistant, solid catalyst containing antimony oxide, suitable for use in a fluidized bed reaction, which comprises the steps of preparing a slurry containing an antimony compound, a polyvalent metal compound and silica sol as essential components, adjusting the pH of the slurry to below 7, heat treating said slurry, subjecting the treated slurry to a conventional spray-drying operation to form substantially spherical particles, and calcining the resulting particles at a temperature of from about 400° C. to about 1,100° C.

DETAILED DESCRIPTION OF THE INVENTION

To produce the desired catalyst containing antimony oxide, a pentavalent antimony compound is used in preparing the slurry. The pH of the slurry is thereafter adjusted to a value below about 7 and, prior to the subsequent spray-drying operation, the slurry is subjected to heat treatment at a temperature of from about 40° C. to about 150° C. for at least about 20 minutes, during which time it is still kept in the slurry state.

The catalyst to be prepared in accordance with this invention preferably comprises the combined oxides of the antimony at least one of iron, cobalt, nickel, tin, uranium, chromium, copper, manganese, titanium, vanadium, molybdenum, tungsten, tellurium, bismuth, arsenic, thorium and cerium.

In a further aspect of the invention, a slurry, consisting essentially of a pentavalent antimony compound, one or more polyvalent compounds, and a silica sol as essential components, may have added thereto ammonium nitrate, in an amount of at least about 1 percent by weight of the entire solid ingredients of the slurry, and thereafter the pH of the slurry is adjusted to a value below about 7.

In other words, the essence of this invention lies in heating prior to the spray-drying of an above described slurry of particular compositions to a temperature of from about 40° C. to about 150° C., preferably from 80° C. to 100° C., for at least about 20 minutes, preferably within the range of from about 1 hour to about 12 hours, during which length of time each component forming the catalyst, inclusive of silica, reacts to form the fundamental framework which serves to impart attrition resistance to the final catalyst.

The process of this invention is widely adapted for a catalyst of the system: Sb-Me wherein Me represents at least one of the above polyvalent metal compounds. The process is particularly adapted to the preparation of a catalyst of the system Sb-Fe, with or without the addition of a small preparation of a promoter.

The atomic ratio of Me to Sb in catalysts of the preferred system can range from about 1:10 to about 5:1. However, optimum catalyst activity appears to be obtained at atomic ratios of Me to Sb within the range of from about 1:5 to about 1:1.

Pentavalent antimony compounds

As starting materials for the pentavalent antimony compounds to be employed in accordance with the invention may be exemplified such as (1) antimony pentoxide, (2) an antimonic acid (pentavalent antimony oxide hydrate) such as ortho-antimonic acid, pyro-antimonic acid, meta-antimonic acid, poly-antimonic acid, etc., (3) an antimony penta halide, such as antimony penta-chloride, and (4) a pentavalent antimony oxyhalide (partial hydrolysis product of antimony penta-halide.

Above described compound (2) can be obtaind, for example, by the hydrolysis of antimony penta-halide or the hydrolysis of an alkali metal salt of pyro-antimonic acid, etc. Although the use of a pentavalent antimony compound is essential in this invention, it is not always necessary that the compound to be used must contain only pentavalent antimony. In other words, as long as the majority of the antimony is in pentavalent form, some trivalent antimony may be included. Accordingly, in addition to the pentavalent compounds of (1) to (4), above, the following products can also be used in the present invention: (5) a highly oxidized antimony product obtained by heating and decomposing a nitric acid oxidized antimony (a product obtained by oxidizing metallic antimony with nitric acid) by repeating the addition of nitric acid and evaporation to dryness; (6) a highly oxidized antimony product obtained by oxidizing antimony trioxide (or antimony tetroxide) by repeated addition of nitric acid and evaporation to dryness; (7) a product obtained by treating metallic antimony, antimony trioxide, or antimony tetraoxide with a mixed acid consisting of nitric acid and hydrochloric acid; and (8) a product obtained by oxidizing an antimony trihalide or a trivalent antimony oxyhalide (partial hydrolysis product of antimony trihalide) with nitric acid.

In a preferred embodiment of the invention, the foregoing compounds are in the form of finely divided particles dispersed in an aqueous medium, more preferably in the form of a colloid or quasi-solution in the medium. For use, therefore, compound (1) and products (5) or (6) are preferably pulverized. The other compounds or products mentioned are usually suitable without a prior pulverizing treatment.

When the compounds or products (3), (4), (7) and (8) are used as the source of pentavalent antimony compound in the process of this invention, it is preferred to remove chlorine components by conventional treatment such as hydrolyzing these compounds with water or an aqueous solution of a basic substance (preferably a volatile base such as ammonia) and washing with water. Alternatively, it is possible to remove the majority of chlorine from these chlorine-containing antimony compounds by boiling a slurry of the compound in nitric acid. Further, compounds or products (3), (4), (7) and (8) can be used as starting materials of the present invention as they are (without a prior dechlorination treatment), since such dechlorination treatment can be carried out in the below-mentioned step of slurry heating the product slurry.

Polyvalent metal compounds

As polyvalent metal compounds to be used in accordance with the present invention may be exemplified compounds of a polyvalent metal selected from the group consisting of iron, cobalt, nickel, tin, uranium, chromium, copper, manganese, titanium, vanadium, molybdenum, tuungsten, tellurium, bismuth, arsenic, thorium and cerium. Preferably, these polyvalent metal compounds are either soluble in water or are such that at least a portion thereof becomes soluble in water by a heat treatment as described hereinafter.

The above-mentioned compounds may be used solely or in combination dependent upon the metals and the types of compounds. Where more than two compounds are used, at least one must be either soluble or partially soluble in water.

The particular polyvalent metal employed and the ratio of the metallic components in the catalyst compositions may be properly selected dependent upon the desired catalytic activity by those skilled in the art. However, according to another aspect of the present invention, the antimony-containing compositions so selected may be additionally compounded with further components to improve the physical properties of the catalyst. Such additional components may be particularly effective for preventing the formation of "sticks" (a minute splinter material projectingly formed on the surface of catalyst) often encountered in the preparation of catalyst compositions in which the atomic ratio of the polyvalent metal to antimony is less than 1:2.

For example, Sb-Fe catalyst compositions and Sb-Fe catalyst compositions promoted by a small amount of V, Mo, W and/or a small amount of Te give excellent catalytic activity where the atomic ratio of Me:Sb is less than 1:1, in particular less than 1:2, wherein Me comprises Fe, V, Mo, W and Te. However, in such cases, said catalyst compositions are liable to form a "stick" in the preparation thereof, particularly in the process of final calcination. However, the "stick" formed on the surface of such catalyst compositions can be remarkably decreased or substantially eliminated by additionally compounding a small amount of another elemental component in the preparation of said catalyst compositions. In this case, copper or magnesium are particularly effective as a "stick" inhibitor and this result can be obtained while maintaining activity above the original catalyst activity, by additionally compounding 0.01 to 0.4, preferably 0.1 to 0.2 gram atom of Cu or Mg per 1 gram atom of Sb. Other antimony-polyvalent metal catalyst compositions, for example, Sb-U and Sb-Sn catalyst systems respond in substantially the same manner to such additions.

When employing a catalyst having "sticks" in fluid bed reactors the sticks are liable to be peeled off from the catalyst and scattered as viscous fine fragments to plug the outlet of the reaction vessel. Therefore, the composition and preparation of catalysts suitable for the reactions in fluid beds should be determined considering not only the activity but also the abrasion resistance and prevention of such "sticks."

"Sticks" have been found to form from antimony oxides independent of the kind of polyvalent metal employed in the antimony-containing catalyst system, and to prevent such "sticks," any metallic elements which, when mixed with an antimony oxide and the mixture calcinated at 300 to 1000° C., can react with the antimony oxide have been found to be useful for the purpose.

These metallic elements include, in addition to the above polyvalent metals, alkali metals such as sodium and potassium, alkaline earth metals such as magnesium, calcium and barium, zinc, cadmium, aluminum zirconium and lead. From the viewpoint of stick prevention, the identity and combination ratio of the above metallic elements is not particularly limited but should be properly selected substantially from the viewpoint of catalytic activity. The process for preparing a catalyst containing one or more of these metallic elements is contemplated within the scope of the present invention.

In the preparation of the attrition-resistant catalysts of the present invention, the polyvalent metal compounds do not present such serious problems as with the antimony compounds, since it is easy to choose a water-soluble compound from a number of polyvalent metal compounds, whence it follows that little trouble is encountered with respect to the uniform dispersion of the catalyst-forming ingredients in the slurry.

As starting materials for the iron, cobalt, nickel, uranium, chromium, copper, manganese, bismuth, thorium and cerium components, nitrates thereof, which are soluble in water and capable of providing nitrate ion, can conveniently be used. As starting materials for the vanadium component, there can conveniently be used such water-soluble compounds as ammonium metavanadate and vanadyl oxalate. As starting materials for the molybdenum and tungsten components, there can be conveniently used such water-soluble compounds as ammonium para (or meta) molybdate and ammonium para (or meta) tungstate. As starting materials for the titanium and tin components, there can preferably be used chlorides thereof, since they are partially water-soluble in an aqueous medium containing hydrochloric acid and can provide finely divided oxychlorides and oxide particles upon hydrolysis in the medium. As starting materials for the tellurium and arsenic components, there can be used any of their acids and oxides, such as, for example, telluric acid, tellurous acid, arsenic acid, arsenous acid; tellurium dioxide, arsenic trioxide, and arsenic pentoxide, the tellurium dioxide being used in the form of a solution comprising nitric acid which serves as an oxidizing agent and tellurium.

However, the invention is not in any way limited to the use of such compounds. In addition to the starting materials for each component as disclosed above, other water-soluble compounds may also be employed. In addition to this, even compounds which are slightly soluble in water can be used so long as it is possible to render it finely divided in an aqueous medium. As for the tin compounds, for example, there may be employed an oxidation product of metallic tin with nitric acid or tin oxides such as stannous oxide and stannic oxide. With regard to these compounds, pulverization prior to use is generally required.

Silica sol

Concerning the preparation of the silica sol to be used in accordance with this invention, many known methods are available. However, it is convenient to employ one chosen from commercially available silica sols. The silica sol is used at a concentration, referring to the silica content in the silica sol, of from about 5% to about 90% on a weight basis. Slurries having a silica content lower than the above lower limit are inconvenient to handle because the concentration of the slurry is overly diluted. On the other hand, stability of the sol suffers with a slurry of silica content in excess of the above-described upper limit. Preferably, the silica content falls within a range from about 10% to about 50% by weight. Further, the amount of silica sol to be used ranges preferably from about 10% to about 90% when calculated as silica per 100 parts by weight of the final catalyst. When it is used in an amount below the lower limit described above, the final catalyst exhibits a reduced attrition resistance in many cases. When silica sol in excess of the above-described upper limit is used, the catalytic activity of the resulting catalyst often becomes lowered.

Should an aqueous silica sol be used, care should be taken so as to keep it from freezing prior to use. From an economical point of view it is preferred to use such an aqueous silica sol, so that when the invention is to be carried out in cold districts, the aqueous silica sol may have incorporated therein, for the purpose of preventing it from freezing during storage, one or more anti-freeze agents, such as, for example, lower alcohols such as methanol, ethanol, propanol and butanol, lower alkylene glycols such as ethylene glycol and propylene glycol, alkyl Cellosolves such as methyl Cellosolve and ethyl Cellosolve, alone or together with water, to form a suspension or dispersion thereof.

The silica sols provide a silica component which serves to form a carrier or support of the final catalyst. The use of silica sol is essential to the invention. However, the silica sol may be, if desired, used in combination with one or more other carrier components such as silica in various forms other than a sol, such as silica gel and diatomaceous earth, alumina materials in the form of sols, gels or powders, zirconia, magnesia, beryllia and the like. In such cases, however, materials in a form other than a sol should preferably be finely divided.

Slurry preparation (mixing and pH-adjustment)

In carrying out the process of the invention, a slurry is first prepared by mixing the aforesaid pentavalent antimony compound which may be in dry, wet, aqueous slurry or aqueous solution form, with the aforesaid polyvalent metal compound which may likewise be dry, wet, aqueous slurry or aqueous solution form, and the silica sol, together with water. For the purposes of this invention, it is only essential that the three components mentioned above must be admixed together during the time when the heat treatment is conducted.

The solids content of the slurry may preferably fall within the range from about 0.5% to about 50% on a weight basis as calculated in terms of the oxides of the elements which make up the catalyst. With a slurry of a solids content above the aforesaid upper limit, it becomes difficult to conduct the subsequent operations, especially the heat treating hereinafter described and the spray-drying due to its increased viscosity. The use of a slurry of a solids content below the aforesaid lower limit is disadvantageous from the viewpoint of economy, since a very large amount of water must be removed in the heat treating procedure.

Although the order in which the aforesaid three components are mixed is not critical, it is desirable from the standpoint of facility of operation and the uniform dispersion of each component that first a solution, second a colloid and finally a dispersion which is apt to precipitate are mixed with one another in that order. In a catalyst of the system: Sb-Fe-Si, for instance, to an aqueous solution of ferric nitrate there is first added a silica sol with stirring and finally either an antimony compound or an aqueous slurry comprising the antimony compound. However, the components may be mixed with one another in any order, if sufficient stirring is effected.

Each component may also be mixed with another one at a time. Alternatively, one or more components may first be mixed wholly or partially with respect to their proportion, the resulting mixture then subjected to a pH-adjustment to obtain the slurry hereinafter described, and the remaining components and the proportions of the aforesaid components may finally be added, during or after the completion of heat treating of the slurry, to produce the desired admixture to be again subjected to heat treatment.

Immediately before the heat treatment, a pH-adjustment is effected on the aforesaid slurry under stirring until a pH of below about 7, preferably with a range from about 1 to about 4, is obtained for the mixture. Any local increase in pH should be avoided during the pH adjustment.

As pH adjustment agents there may be used volatile acids and/or volatile bases. As volatile acids may be mentioned nitric acid, hydrohalogenic acids, various organic acids such as formic acid, oxalic acid, citric acid, tartaric acid and so on, carbon dioxide gas and aqueous carbonic acid. Among these acids, the most preferred is nitric acid. As volatile bases there may be exemplified gaseous or aqueous ammonia, organic amines, such as methylamine, ethylamine, methanolamine, ethanolamine, aniline, pyridines, quinolines and the like. Among these bases, the most preferred is gaseous or aqueous ammonia.

The slurry, which is to be subjected to the heat treatment, must be of high uniformity or homogeneity, so that the use of stirring is preferred in the slurry preparation procedure. This, however, amounts to no more than conventional technology and is not an essential element of the invention.

Heat treatment procedure

The slurry as prepared above is then heated to a temperature of from about 40° C. to about 150° C., preferably from about 80° C. to about 100° C., for at least about 20 minutes, preferably from about 1 to about 12 hours. This heat treatment is one of the main characteristics of the invention, by which excellent attrition resistance is imparted to the finished catalyst.

It should be noted that the phenomena resulting from the heat treatment include not only mere temperature elevation of the slurry and vaporization of water therefrom but involves also very complex chemical reactions. In fact, there may be observed during the heat treatment at least some of the following: viscosity increase and color change of the slurry; particle size reduction with respect to at least a portion of the antimony compound; and quantitative and qualitative variations in the silica particles remaining in the form of a sol. These phenomena indicate the fact that the antimony, polyvalent metal and silica contained in the slurry react with one another in a complicated manner.

The lower-most limit as to temperature which may be employed in order to achieve the aforesaid objects of the invention are selected on the basis of the atomic ratio of polyvalent metal to antimony to silicon in a slurry, the particular polyvalent metal employed and the kind of and degree of fineness of the antimony compound used. Temperatures above about 40° C., however, result in the foregoing reactions taking place with the result that the objects of the invention are attained. Especially, at a temperature greater than about 80° C., it has been recognized that the effectiveness is more rapidly brought about and to a greater extent. Heat treatment at a temperature in the vicinity of the boiling point of the slurry, that is to say, about 100° C., is convenient from the standpoint of keeping the slurry at a constant temperature, and has the additional advantage that the slurry is effectively stirred by the boiling phenomenon above, which results in the objects of the invention being brought about rapidly and favorably.

Although heat treatment under pressure, which is carried out at a temperature above 100° C., is also effective, it is disadvantageous from an economical point of view, due to the expense of apparatus and operation.

So far as attrition resistance is concerned, heat treatment at a temperature in excess of about 150° C. does not afford any further advantage worth the high cost incurred.

The lower-most limit of time of heat treatment in order to achieve the aforesaid objects of the invention depends mainly on the temperature, but it is also somewhat affected by the other considerations discussed above with regard to temperature. Heating over a length of time of at least about 20 minutes, however, has been found to effectuate the foregoing reactions at least in part with the result that the objects of the invention are brought about. Preferably, the heating time ranges from about 1 hour to about 12 hours. In general, the foregoing reactions proceed more rapidly with a higher heating temperature, a larger atomic ratio of polyvalent metal to antimony (Me/Sb) and a higher degree of pulverization of antimony compound.

On the other hand, no substantially harmful effect appears, even if heat treatment is continued for a time far longer than the above-mentioned lower-most limit. For instance, no substantially harmful effect was observed when a slurry, whose appropriate heat treatment is of the order of 1 hour, was heat treated for as long as 10 hours. But an excessively long heat treatment may have an adverse influence on the attrition resistance of a finished catalyst, especially if it is carried out at a temperature of above 100° C. However, any adverse influence obtained is very slight so long as the heat treatment does not exceed about 24 hours.

The heat treatment can be effected either in an open type of apparatus, in which the slurry is concentrated, or in a closed type of apparatus in which water evaporating from the slurry is refluxed. Generally, the former is favorably applied to a diluted slurry, and the latter to a concentrated one. It should, of course, be mentioned that the former method is also applicable to a concentrated slurry with occasional addition of water to said concentrated slurry.

In either case, the heat treatment can be performed on a slurry of any concentration, so long as it remains in its slurry form. In any case, however, the heat treatment must not be continued until the slurry is evaporated to dryness.

Ammonium nitrate in a slurry

The effectiveness of the invention, that is, improvement of the attrition resistance of a catalyst will be brought about to a greater extent if ammonium nitrate is present in the slurry at the time when the slurry is heat treated. In a preferred embodiment of the invention a slurry contains both nitrate ions, from a polyvalent metal nitrate or added nitric acid, and ammonium, from aqueous ammonia used as a pH adjustment agent, so that there is no special need to incorporate ammonium nitrate in it. Of course, the effectiveness of the invention will also be sufficiently attained, with the production of a catalyst having an attrition resistance sufficient for practical use, even if no ammonium nitrate is present therein. Since the presence of ammonium nitrate in the slurry is favorable for the preparation of a catalyst of good attrition resistance and does not result in any harmful influence, even when it is additionally incorporated therein, however, it is very advantageous to additionally incorporate ammonium nitrate to the slurry, whether it contains both nitrate ions and ammonium ions or not.

Although the amount of ammonium nitrate to be additionally added is not critical, a preferred amount is in the range from about 1% to about 30% by weight of the total solids content in the slurry. Although the role of the ammonium nitrate is not clear, it is believed that it has some effect upon the crystal grain rearrangement of the catalyst. The smaller the atomic ratio of polyvalent metal to antimony, the more effectiveness of the ammonium nitrate has on the system.

Other procedures

After the above-mentioned heat treatment procedure, the slurry is spray-dried so as to be shaped in the form of substantially spherical particles of very small dimensions.

Any prior art spray-drying means, such as, for example, pressurized-nozzle and rotary-disk types of spray-dryers can be utilized. The solid content of a slurry to be subjected to spray-drying is preferably in the range from about 10% to about 40% by weight when calculated as oxides of the elements which make up a final catalyst. However, the foregoing range is not critical. A solids content below about 10% will do if a certain amount of economical disadvantage may be endured, and a solids content above about 40% will also do if slight inconvenience of operation is allowable.

It is very convenient from the viewpoint of simplicity of operation to spray-dry a slurry immediately after the heat treatment thereof, but it is not essential. The spray-drying may also be carried out after a relatively long time after the heat treatment. Also, it may be executed after the slurry is conditioned with respect to its solid content, either by dilution with water or by concentration through reheating. Although it is preferred from the standpoint of homogeneity of the resulting catalyst to completely mix each component of the slurry prior to its spray-drying by means of a homogenizer, the use of a homogenizer is not always necessary, so long as both the heat treatment and the subsequent optional adjustment of slurry concentration are executed with sufficient stirring.

The atmosphere in which spray-drying is carried out is not critical but the employment of a non-reducing atmosphere is preferred. In the interest of economy, a fuel combustion gas container an excessive amount of air is preferably used, but a stream containing oxygen in more or less concentration may also be employed.

For fluidized bed use, there may be preferably used a catalyst, 80 weight percent or more of which ranges from about 5 to about 100 microns in particle size. However, the primary object of the invention, that is, to increase the attrition resistance of a catalyst, can be achieved, irrespective of the size distribution of catalyst particles.

After the completion of spray-drying, the finely divided catalyst is immediately calcined, either after standing for a suitable length of time, or after being further subjected to drying at a temperature between about 200° C. and 400° C. The calcination temperature may range from about 400° C. to about 1,100° C.

Calcination can be effected either step-wise, viz., in two steps, a pre-calcination followed by a final calcination, or by means of a single-stage calcination. When a high temperature calcination, for example, calcination at an elevated temperature greater than 700° C., is desired, the foregoing step-wise method is preferred. In this case, pre-calcination is preferably carried out at a temperature from about 350° C. to about 600° C.

The atmosphere in which calcination is carried out is not critical, but the employment of a non-reducing atmosphere is preferred. In the interest of economy, an air stream is preferably used, but a stream containing oxygen in more or less concentration than that of air may also be used.

Any of the types of heating means which are generally known in the art may be employed for the calcination. Classified as to the states of catalysts to be processed, for instance, there are exemplified the following:

| | |
|---|---|
| Stationary type | Electric furnace of the box type, electric furnace of the tunnel type, muffle furnace of the hot blast heating type, etc. |
| Movable type | Various kinds of rotary furnaces of the internal or external heating type using electric energy or fuel gas. |
| Fluidized bed type | Heating furnaces of the fluidized bed type, employing the internal or external heating using electric energy or fuel gas. |
| Others | High frequency furnace. |

When a stationary type of furnace is used, a catalyst may show a tendency to "caking," especially when the temperature is in excess of 700° C. It is therefore preferred to calcine the catalyst in as thin a layer as possible. This is considered to be favorable both from the standpoint of sufficient contact of the catalyst with the heated atmosphere and of the uniform calcination temperature of the entire catalyst.

When a movable type of furnace is used, in which spontaneous stirring, agitation or circulation of the catalyst takes place, the above is not a problem. In order to uniformly calcine the catalyst through the entire body thereof, however, due regard has to be paid to the operation of furnace and the state of contact of catalyst with the heating surface.

Fluidized bed heating is the most preferred method, when judged from all viewpoints, namely, prevention of caking, contact of the catalyst with the heated atmosphere and uniform heating of the catalyst. Since a catalyst immediately after spray-drying is still of poor mechanical strength in many cases, however, it is preferred to limit the linear velocity of the gas stream by which the catalyst is fluidized to no more than about 40 cm./sec. In this case, it may be advisable to preliminarily calcine the catalyst using another type of furnace, such as a stationary or movable type, and to finally calcine using the fluidized bed type of furnace. Thus, the resulting catalyst achieves a mechanical strength sufficient to endure more severe operational conditions, that is, extremely high linear velocities of the gas stream. Heating in a fluidized bed, however, can be executed satisfactorily, when a gas stream having a linear velocity equal to or somewhat greater than that at which fluidization of a catalyst begins (that is, generally, of the order of several centimeters per second) is used. Accordingly, there is no need of using a gas stream having an extremely high linear velocity, and therefore the heating in a fluidized bed is useful both in pre-calcination and final calcination.

Both the movable and fluidized types of furnaces can be either of the internal heating type, being provided with a heating element arranged internally or means through which a hot gas is introduced, or of the external heating type, which is heated only over the outer portion.

Pre-calcination and final calcination may be caried out (1) in one furnace such that the former is carried out first and then the latter at a high temperature in the same zone of the furnace, or such that the former is carried out in a first zone and the latter in a second zone as in a tunnel furnace or rotary furnace, (2) in a series of the same type of furnaces such that the former is carried out in one or more furnaces and the latter in the others, or (3) in a plurality of various types of furnaces.

The above also applies to drying-pre-calcination and drying-pre-calcination-final calcination.

In addition, high frequency heating, which has recently been used in various fields, is also usable, either solely or in combination with any of the foregoing.

The invention will now be more clearly illustrated by the following examples together with controls which have been taken for comparison in accordance with prior art methods of preparing catalysts.

EXAMPLE 1

A catalyst for fluidized bed use and having the empirical formula: $Fe_{10}Sb_{25}Si_{30}O_{125}$, which being inclusive the carrier material (unless otherwise noted, all empirical formulas referred to hereinafter include the carrier), was prepared as follows:

(I) 11.6 kg. of antimony pentachloride were incrementally poured into 30 l. of water having floating lumps of ice, and 28% aqueous ammonia was gradually added thereto until the pH was adjusted to 8. The precipitate produced was filtered and washed three times with 5 ls. of cold water.

(II) To a mixture of 6.25 liters of nitric acid (specific gravity: 1.38) and 7.75 liters of water heated to about 80° C., there was added slowly 0.865 kg. of electrolytic iron powder. The resulting mixture was left standing until the iron dissolved completely.

(III) There was provided 13.9 kg. of a silica sol having a silica content of 20% by weight (commercially available as "Snow Tex 0" from Nissan Chem. Industries Co., Ltd.)

Products (I), (II), and (III) were mixed with one another and small increments of 15 wt. percent aqueous ammonia were added while stirring, to adjust the pH of the mixture to 2.0. (In the following description, "pH of the conditioned slurry" is meant to indicate the pH following such treatment.)

The slurry thus obtained was heated at 100° C. for 2 hours while stirring, which resulted in an increase in the viscosity thereof and homogenization.

The slurry was then adjusted to a solids concentration of about 20% by weight of the oxides of the elements which make up the catalyst (in the following description, the term "slurry concentration" is used to mean the solid content, by weight, calculated as oxides of the elements contained in the slurry, as in this example), and spray-dried using a rotary disk type of spray-drying apparatus.

Micro-spherical particles obtained by the above procedure were heated in a rotary furnace of the external heating type to a final temperature of 650° C. over a period of about 3 hours, and then calcined at 850° C. for 2 hours in an electric furnace, to obtain the desired catalyst, more than 90% of which are with a particle size range of from 20 to 105 microns, and having a mean weight diameter of 59 microns.

EXAMPLE 2

A catalyst for fluidized bed use and having the empirical formula $Fe_{10}Sb_{25}Si_{30}O_{125}$ was prepared by repeating the procedures of Example 1, with the exception that the slurry was heated at 80° C. for 8 hours.

EXAMPLE 3

A catalyst for fluidized bed use and having the empirical formula $Fe_{10}Sb_{25}Si_{30}O_{125}$ was prepared by repeating the procedures of Example 1, with the exception that the pH of the slurry was adjusted to 4.0 at the time of slurry preparation.

EXAMPLE 4

A catalyst for fluidized bed use and having the empirical formula $FE_{10}Sb_{25}Si_{30}O_{125}$ was prepared by repeating the procedures of Example 1, with the exception that there was used a silica sol having a silica content of 30% by weight (commercially available as "LUDOX HS" from Du Pont Co., Ltd.)

EXAMPLE 5

A catalyst for fluidized bed use and having the empirical formula $Fe_{10}Sb_{25}Si_{30}O_{125}$ was prepared by repeating the procedures of Example 1, with the exception that the antimony material used was produced by gradually adding 4.72 kg. of metallic antimony powder having a particle size below 100$\mu$ to 17.5 l. of nitric acid having a specific gravity of 1.38 and heated to about 80° C., further heating to dryness, adding 5 ls. of nitric acid thereinto and again heating to dryness. This operation was repeated twice. The majority of the antimony oxide so obtained was antimony pentoxide, which was then pulverized in a ball mill for 3 hours.

EXAMPLE 6

A catalyst for fluidized bed use and having the empirical formula $FE_{10}Sb_{25}Si_{30}O_{125}$ was prepared as follows:

(I) 4.72 kg. of metallic antimony powder below 100$\mu$ in particle size was gradually added to a heated solution of 17.5 l. of nitric acid having a specific gravity of 1.38 and 19.3 ls. of 35% hydrochloric acid. After the powder was completely dissolved, 0.865 kg. of iron powder was gradually dissolved therein.

(II) As the silica material there was provided 13.9 kg. of a silica sol having a silica content of 20% by weight (commercially available as "SNOW TEX 20" from Nissan Chem. Industries Co., Ltd.).

Products (I) and (II) were mixed with one another and the slurry thus obtained was heated at 100° C. for 4 hours while stirring.

The slurry was then adjusted to a solids content of about 18% by weight and spray-dried using a spray-drying apparatus of the rotary disk type.

Micro-spherical obtained by the above procedure were heated in a rotary furnace at 600° C. for 2 hours, and then calcined in a fluidized bed heater at 850° C. for 3 hours.

EXAMPLE 7

A catalyst for fluidized bed use and having the empirical formula $Fe_{10}Sb_{25}Si_{30}O_{125}$ was prepared as follows:

(I) 8.84 kg. of antimony trichloride were gradually added to 10 ls. of nitric acid having a specific gravity of 1.38 and heated at about 70° C. After heating for about 20 minutes and cooling, 15% aqueous ammonia was gradually added thereto to adjust the pH to 8. The precipitate produced was washed three times with 5 ls. of water.

(II) There was also provided 0.865 kg. of electrolytic iron powder, which was slowly added into a mixture of 6.25 ls. of nitric acid (specific gravity: 1.38) and 7.75 ls. of water heated to about 80° C. and left to stand until the iron dissolved completely.

(III) There was further provided 13.9 kg. of silica sol having a silica content of 20% by weight (commercially available as "SNOW TEX 0"). Products (I), (II) and (III) were mixed together while stirring and 15% by weights of aqueous ammonia was slowly added to adjust the pH of the mixture to 2.5.

The slurry thus prepared was charged to an autoclave and heated at 130° C. for 30 minutes while stirring.

After withdrawing the slurry from the autoclave, it was spray-dried using a rotary disk type of spray drying apparatus.

Micro-spherical particles obtained by the above procedure were heated in a rotary furnace of the external heating type at 600° C. for 2 hours, and then calcined in an electric furnace at 830° C. for 2 hours.

EXAMPLE 8–A

A catalyst for fluidized bed use and having the empirical formula $Fe_{10}Sb_{25}Si_{30}O_{125}$ was prepared as follows:

(I) 11.6 kg. of antimony pentachloride, 4.1 kg. of ferric chloride and 20 kg. of 20% hydrochloric acid were mixed.

(II) 18 kg. of 28% aqueous ammonia and 42 kg. of water were mixed and the liquid produced from (I) was gradually poured thereinto while stirring. The precipitate produced was washed five times with 3 kg. of water.

(III) There was provided 13.9 kg. of a silica sol having a silica content of 20% by weight (commercially available as "SNOW TEX 0" from Nissan Chem. Industries Co., Ltd.).

Products (II and (III) were mixed and 15 ls. of water were added thereto and well stirred. The pH of this slurry was 4.1. The slurry was heated while stirring at 100° C. for 2 hours. Following this, the spray-drying, and calcining operations of Example 1 were carried out to complete the preparation of the catalyst.

EXAMPLE 8–B

A catalyst for fluidized bed use and having the empirical formula $Fe_{10}Sb_{25}Si_{30}O_{125}$ was prepared as in Example 8–A with the exception that, prior to conditioning of the slurry, 1.5 kg. of powdered ammonium nitrate was added to it.

EXAMPLE 9

A catalyst for fluidized bed use and having the empirical formula $Fe_{10}Sb_{25}Si_{30}O_{125}$ was prepared as follows:

(I) 62.7 kg. of antimony pentoxide sol (containing 10% by weight of $Sb_2O_5$) prepared by acidic hydrolysis of antimony pentachloride were provided.

(II) To a mixture composed of 6.25 ls. of nitric acid (specific gravity 1.38) and 7.75 ls. of water heated to about 80° C. there was slowly added 0.865 kg. electrolytic iron powder and the mixture was allowed to stand until the iron dissolved completely.

(III) There was provided 13.9 kg. of a silica sol having a silica content of 20% by weight (commercially available as "SNOW TEX 0").

Products (I), (II), and (III) were mixed with one another and to the mixture was gradually added 15% by weight aqueous ammonia in small increments while stirring until the pH of the mixture reached 2.0.

The slurry thus prepared was heated at 50° C. for 16 hours while stirring, followed by spray-drying.

Micro-spherical particles thus obtained were calcined in an external heating type rotary furnace at 650° C. for 2 hours, and further calcined in an electric furnace at 830° C. for 2 hours.

EXAMPLE 10

A catalyst for fluidized bed use and having the empirical formula $Fe_{10}Sb_{14}Si_{20}O_{83}$ was prepared as follows:

(I) 6.48 kg. of antimony pentachloride were gradually poured into 20 ls. of water containing floating lumps of ice. Subsequently, 15% aqueous ammonium was added thereto to adjust the pH to 8. The precipitate produced was filtered and washed three times with 3 ls. of water.

(II) To a mixture composed of 6.25 ls. of nitric acid (specific gravity: 1.38) and 7.75 ls. of water heated to about 80° C. there was slowly added 0.95 kg. of electrolytic iron powder, and the resulting mixture was left standing until the iron powder dissolved completely (III) 9.30 kg. of a silica sol having a silica content of 20% by weight (commercially available as "SNOW TEX 0") was provided.

Products (I), (II) and (III) were mixed with one another and 15% by weight aqueous ammonia was added with stirring so as to adjust the pH of the mixture to 2.0.

The slurry thus prepared was heated to 70° C. for 20 hours under agitation. After adjusting the solids content thereof to a value of 20% by weight, it was spray-dried.

Micro-spherical particles thus obtained were calcined in an external heating type rotary furnace at 650° C. for 2 hours, and further calcined in an electric furnace at 830° C. for 2 hours.

EXAMPLE 11

A catalyst for fluidized bed use and having the empirical formula $Fe_{10}Sb_{60}Si_{100}O_{335}$ was prepared as follows:

(I) 13.88 kg. of antimony pentachloride was gradually poured into 30 ls. of water containing floating lumps of ice. Subsequently, 28% aqueous ammonium was gradually added thereto to adjust the pH to 8. The precipitate produced was filtered and washed three times with 5 ls. of water.

(II) To a mixture composed of 3.12 ls. of nitric acid (specific gravity: 1.38) and 3.88 ls. of water heated to about 80° C. there was slowly added 0.432 kg. of electrolytic iron powder, the resulting mixture being left to stand until the iron powder dissolved therein completely.

(III) There was provided 3.3 kg. of silica sol having a silica content of 20% by weight (commercially available as "SNOW TEX 0").

Products (I), (II) and (III) were mixed with one another and there was slowly added, while stirring, 15 wt. percent aqueous ammonia so as to adjust the pH of the mixture to 2.0.

The slurry thus prepared was heated at 120° C. for 40 minutes while stirring, followed by drying, using spray-drying apparatus.

Micro-spherical particles thus obtained were calcined in an external heating type rotary furnace at 650° C. for 2 hours, and further calcined in an electric furnace at 800° C. for 2 hours.

EXAMPLE 12

A catalyst for fluidized bed use and having the empirical formula $U_{10}Sb_{40}Si_{50}O_{206.6}$ was prepared as follows:

(I) 4.79 kg. of antimony pentachloride were gradually poured into 20 ls. of water containing floating lumps of ice. Subsequently, 28% aqueous ammonia was gradually added thereto to adjust the pH to 8. The precipitate produced was filtered and washed three times with 3 ls. of water.

(II) Into 5 ls. of water there was dissolved 2.0 kg. of uranium nitrate $[UO_2(NO_3)_2 \cdot 6H_2O]$.

(III) 6 kg. of silica sol having a silica content of 20% by weight ("SNOW TEX 0") was provided.

Products (I), (II), and (III) were mixed with one another and to the mixture was slowly added 15 wt. percent aqueous ammonia while stirring to adjust the mixture's pH to 2.0.

The slurry thus prepared was heated at 100° C. for 5 hours while stirring, and then subjected to spray-drying.

Micro-spherical particles thus obtained were heated at 200° C. for 4 hours, then at 400° C. for 4 hours and finally at 800° C. for 4 hours to effect calcination.

EXAMPLE 13

A catalyst for fluidized bed use and having the empirical formula $Sn_{10}Sb_{60}Si_{100}O_{34}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) One liter of nitric acid (specific gravity: 1.38) was heated to about 80° C. and there was added slowly 0.317 kg. of powder metallic tin below 100 microns in particle size to be completely oxidized.

(III) There was provided 8.02 kg. of a silica sol having a silica content of 20% by weight ("SNOW TEX 0").

Products (I), (II), and (III) were mixed with one another, and to the mixture was slowly added, while stirring, 28% aqueous ammonia, so as to adjust the pH of the mixture to 2.5.

The slurry thus prepared was heated at 100° C. for 4 hours while stirring, and then subjected to spray-drying.

Micro-spherical particles thus obtained were heated gradually to a final temperature of 800° C. for about 6 hours, using an external heating type rotary furnace for the calcination.

EXAMPLE 14

A catalyst for a fluidized bed use and having the empirical formula $Cr_{10}Sb_{25}Si_{30}O_{125}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) Into 5 ls. of water there was dissolved 2.56 kg. of chromic nitrate $[Cr(NO_3)_3 \cdot 9H_2O]$.

(III) There was provided 5.77 kg. of a silica sol having a silica content of 20% by weight ("SNOW TEX 0").

Products (I), (II) and (III) were mixed with one another, and to the mixture was slowly added 15 wt. percent aqueous ammonia under stirring, so as to adjust the pH of the mixture to 2.5.

The slurry thus prepared was heated at 100° C. for 8 hours while stirring, followed by spray-drying.

Micro-spherical particles of very small dimensions, thus obtained, were heated at 200° C. for 2 hours, then at 400° C. for 2 hours, thereafter at 600° C. for 2 hours and finally at 850° C. for 2 hours, respectively, for calcination.

EXAMPLE 15

A catalyst for fluidized bed use and having the empirical formula $Mn_{10}Sb_{25}Si_{30}O_{130}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) In 5 ls. of water there was dissolved 1.84 kg. of manganese nitrate $[Mn(NO_3)_2 \cdot 6H_2O]$.

(III) There was provided 5.77 kg. of a silica sol having a silica content of 20% by weight ("SNOW TEX 0").

Products (I), (II), and (III) were mixed with one another, and to the mixture was slowly added 15 wt. percent aqueous ammonia while stirring so as to adjust the pH of the mixture to 2.0.

The slurry thus prepared was heated at 100° C. for 8 hours while stirring, followed by spray-drying.

Micro-spherical particles thus obtained were heated at 200° C. for 2 hours, then at 400° C. for 2 hours, thereafter at 600° C. for 2 hours and finally at 850° C. for 2 hours, respectively for calcination.

EXAMPLE 16

A catalyst for fluidized bed use and having the empirical formula $Cu_{10}Sb_{50}Si_{60}O_{230}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) 774 g. of cupric nitrate $[Cu(NO_3)_2 \cdot 6H_2O]$ was dissolved in 5 ls. of water.

(III) There was provided 5.77 kg. of a silica sol having a silica content of 20% by weight ("SNOW TEX 0").

Products (I), (II), and (III) were mixed with one another and to the mixture was slowly added 15 wt. percent aqueous ammonia while stirring, so as to adjust the pH of the mixture to 4.0.

The slurry thus obtained was heated at 100° C. for 5 hours while stirring, and then subjected to spray-drying.

Micro-spherical particles thus obtained were heated first to 200° C. for 2 hours, then to 400° C. for additional 2 hours and finally to 800° C. for an additional 2 hours, respectively, for calcination.

EXAMPLE 17

A catalyst for fluidized bed use and having the empirical formula $V_{10}Sb_{50}Si_{60}O_{245}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) 0.375 kg. of ammonia metavanadate was suspended in 5 ls. of water.

(III) 5.77 kg. of silica sol having a silica content of 20% by weight ("SNOW TEX 0") was provided.

Products (I), (II), and (III) were mixed together and to the mixture was slowly added, under agitation, 15 wt. percent aqueous ammonia, so as to adjust the pH of the mixture to 3.0.

The slurry thus obtained was heated at 100° C. for 5 hours while stirring and then subjected to spray-drying.

Micro-spherical particles thus obtained were heated to 200° C. for 2 hours, then to 400° C. for 2 hours and finally to 830° C. for 2 hours, respectively for calcination.

EXAMPLE 18

A catalyst for fluidized bed use and having the empirical formula $W_{0.25}Te_{1.0}Fe_{10}Sb_{25}Si_{30}O_{127.8}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The precipitate produced was filtered and washed three times with 3 ls. of water.

(II) To a mixture composed of 3 ls. of nitric acid (specific gravity: 1.38) and 4 ls. of water heated to about 80° C. there was added slowly 0.358 kg. of electrolytic iron powder, the resulting mixture being left standing for the complete dissolution of the iron powder.

(III) 41.8 g. of ammonium tungstate was dissolved in 1.5 ls. of water.

(IV) 147 g. of telluric acid was dissolved in 1 l. of water.

(V) 3.84 kg. of silica sol having a silica content of 30% by weight (Du Pont "Ludox HS") was provided as the silica material.

Products (I)–(V) were mixed together and to the mixture was slowly added 15 wt. percent aqueous ammonia while stirring to adjust the pH of the mixture to 2.0.

The slurry thus prepared was heated at 100° C. for 4 hours while stirring and then subjected to spray-drying.

Micro-spherical particles thus obtained in finely divided form were heated to 200° C. for 4 hours, then to 400° C. for 4 hours, and to 830° C. for 4 hours, respectively, for calcination.

EXAMPLE 19

A catalyst for fluidized bed use and having the empirical formula $W_{0.5}P_{1.0}Fe_{10}Sb_{14}Si_{20}O_{87}$ was prepared as follows:

(I) 4.79 kg. of antimony pentachloride were gradually poured into 10 ls. of water containing floating lumps of ice. Subsequently, 28% aqueous ammonia was gradually added thereto to adjust the pH to 8. The produced precipitate was filtered and washed three times with 3 ls. of water.

(II) To a mixture composed of 6 ls. of nitric acid (specific gravity: 1.38) and 8 liters of water heated to about 80° C. there was slowly added 0.639 kg. of electrolytic iron powder, the resulting mixture being left standing until the iron powder was dissolved completely.

(III) 149 g. of ammonium tungstate was dissolved in 2 ls. of water.

(IV) 132 of 85 wt. percent phosphoric acid was provided.

(V) 6.87 kg. of a silica sol having a silica content of 20% by weight ("SNOW TEX 0") was provided.

Products (I)–(V) were mixed together, and to the mixture was slowly added, while stirring, 15 wt. percent aqueous ammonia, so as to adjust the pH of the mixture to 2.0.

The slurry thus prepared was heated at 100° C. for 4 hours while stirring, followed by spray-drying.

Micro-spherical particles thus obtained were heated, first at 200° C. for 2 hours, then at 400° C. for an additional 2 hours and finally at 830° C. for additional 2 hours, for calcination thereof.

CONTROL 1

A catalyst for fluidized bed use and having the empirical formula $Fe_{10}Sb_{25}Si_{30}O_{125}$ was prepared as follows:

(I) 11.6 kg. of antimony pentachloride were gradually poured into 30 ls. of water containing floating lumps of ice. Subsequently, 28% aqueous ammonia was gradually added thereto to adjust the pH to 8. The precipitate produced was filtered and washed three times with 5 ls. of water.

(II) To a mixture composed of 6.25 ls. of nitric acid (specific gravity: 1.38) and 7.75 ls. of water heated to about 80° C. there was slowly added 0.865 kg. of electrolytic iron powder, the resulting mixture being then allowed to stand until the iron powder was dissolved completely.

(III) 13.9 kg. of a silica sol having a silica content of 20% by weight ("SNOW TEX 0") was provided.

Products (I)–(III) were mixed together, and to the mixture was slowly added 15 wt. percent aqueous ammonia while stirring to adjust the pH of the mixture to 2.0.

The slurry thus prepared was treated three times with a homogenizer for uniform dispersion of the components.

The slurry was then spray-dried without being subjected to any prior heat treatment, using the rotary disk type of spray-drying apparatus.

Micro-spherical particles thus obtained were gradually heated in an external heating type rotary furnace to a final temperature of 650° C. over about 3 hours, and then in an electric furnace at 850° C. for 2 hours.

This control was executed in the same manner as in Example 1, except that no heat treatment of the slurry was performed and that treatment by means of a homogenizer was performed for rendering the slurry homogeneous.

CONTROL 2

A catalyst for a fluidized bed use and having the empirical formula $Fe_{10}Sb_{25}Si_{30}O_{125}$ was prepared by the same procedure as in Example 1, with the exception that the pH value of the slurry was adjusted to 8 before heat treatment.

CONTROL 3

A catalyst for fluidized bed use and having the empirical formula $Fe_{10}Sb_{25}Si_{30}O_{125}$ was prepared as follows:

To 18.9 ls. of nitric acid (specific gravity: 1.38) heated to about 80° C. there was slowly added 4.72 kg. of powdery metallic antimony which passed through an 80 mesh screen. After completion of the oxidation of the antimony there was added 6.26 kg. of ferric nitrate

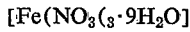

and the resulting mixture was evaporated almost to dryness.

To the solid product thus obtained there were added 9.28 kg. of a silica sol having a silica content of 30% by weight ("Ludox HS") and 10 ls. of water, to which was slowly added 28 wt. percent aqueous ammonia while stirring to adjust the pH of the mixture to 8.0.

The precipitate thus produced was recovered by filtering and washed with 180 ls. of water to produce a cake, to which was added water in such an amount that the solid content of the resulting mixture was about 20% by weight. The mixture was treated with a homogenizer, and subjected to spray-drying.

Micro-spherical particles thus obtained were heated at 120° C. for 15 hours, then at 430° C. for 24 hours and finally at 760° C. for 8 hours, respectively, for calcination.

CONTROL 4

A catalyst for fluidized bed use and having the empirical formula $Fe_{10}Sb_{25}O_{65}$ was prepared by repeating the procedure of Example 1 except that no silica sol was used.

CONTROL 5

A catalyst for fluidized bed use and having the empirical formula $Fe_{10}Sb_{25}Si_{30}O_{125}$ was prepared by repeating the procedure of Example 7 except that no heat treatment was applied to the slurry.

CONTROL 6

A catalyst for fluidized bed use and having the empirical formula $Fe_{10}Sb_{14}Si_{20}O_{83}$ was prepared by repeating the procedure of Example 10 except that no heat treatment was applied to the slurry.

CONTROL 7

A catalyst for fluidized bed use and having the empirical formula $Fe_{10}Sb_{60}Si_{100}O_{335}$ was prepared by repeating the procedure of Example 11 except that no heat treatment was applied to the slurry.

CONTROL 8

A catalyst for fluidized bed use and having the empirical formula $U_{10}Sb_{40}Si_{50}O_{206.6}$ was prepared by the same procedure as in Example 12 except that at the time of slurry conditioning its pH was adjusted to 8.

CONTROL 9

A catalyst for fluidized bed use and having the empirical formula $U_{10}Sb_{40}Si_{50}O_{206.6}$ was prepared by repeating the procedure of Example 12 except that no heat treatment was applied to the slurry.

CONTROL 10

A catalyst for fluidized bed use and having the empirical formula $Sn_{10}Sb_{60}Si_{100}O_{340}$ was prepared by repeating the procedure of Example 13 except that at the time of slurry conditioning its pH was adjusted to 8.

CONTROL 11

A catalyst for fluidized bed use and having the empirical formula $Sn_{10}Sb_{60}Si_{100}O_{340}$ was prepared by repeating the procedure of Example 13 except that no heat treatment was applied to the slurry.

CONTROL 12

A catalyst for fluidized bed use and having the empirical formula $Cr_{10}Sb_{25}Si_{30}O_{125}$ was prepared in the same fashion as in Example 14 with the exception that at the time of slurry conditioning its pH was adjusted to 8.

CONTROL 13

A catalyst for fluidized bed use and having the empirical formula $Cr_{10}Sb_{25}Si_{30}O_{125}$ was prepared by repeating the procedure of Example 14 except that no heat treatment was applied to the slurry.

CONTROL 14

A catalyst for fluidized bed use and having the empirical formula $Mn_{10}Sb_{25}Si_{30}O_{130}$ was prepared by repeating the procedure of Example 15 except that no heat treatment was applied to the slurry.

CONTROL 15

A catalyst for fluidized bed use and having the empirical formula $Cu_{10}Sb_{50}Si_{60}O_{233}$ was prepared by repeating the procedure of Example 16 except that no heat treatment was applied to the slurry.

CONTROL 16

A catalyst for fluidized bed use and having the empirical formula $V_{10}Sb_{50}Si_{60}O_{245}$ was prepared by repeating the procedure of Example 17 except that no heat treatment was applied to the slurry.

CONTROL 17

A catalyst for fluidized bed use and having the empirical formula $W_{0.25}Te_{1.0}Fe_{10}Sb_{25}Si_{30}O_{127.8}$ was prepared by repeating the procedure of Example 18 with the exception that the pH of the conditioned slurry was 8.0.

CONTROL 18

A catalyst for fluidized bed use and having the empirical formula $W_{0.5}P_{1.0}Fe_{10}Sb_{14}Si_{20}O_{87}$ was prepared by repeating the procedure of Example 19 except that no heat treatment was applied to the slurry.

Table 1 shows the strength of catalysts prepared in the foregoing Examples and Controls. Measurement of the strength was effected in accordance with the method described in "Test Methods for Synthetic Cracking Catalysts" 6/31-4m-1/57, published by American Cyanamid Co., and known to the art as a test method for fluid catalytic cracking catalysts, the so-called FCC-catalysts.

The test was conducted on catalyst particles ranging from 44 to 88 microns in size.

The R-value and I-value with respect to attrition loss (percent) given in Table 1 were calculated on the basis of the following equations:

$$R = B/(C-A) \times 100$$

$$I = A/C \times 100$$

wherein A represents the weight in grams of catalyst lost by attrition continued for a period of time from 0 to 5 hours, B represents the weight in grams of catalyst lost by attrition continued for a period of time of from 5 to 15 hours, and C represents the weight in grams of catalyst tested by the present test. (C=50 in the tests here conducted.)

TABLE 1.—FLUID ATTRITION TEST

| Catalyst of example No. | Attrition loss, percent | | Control catalyst of control No. | Attrition loss, percent | |
|---|---|---|---|---|---|
| | I | R | | I | R |
| 1 | 3.0 | 1.2 | 1 | 32.1 | 20.1 |
| 2 | 2.0 | 1.0 | 2 | 51.3 | 30.5 |
| 3 | 3.8 | 2.1 | 3 | 15.3 | 5.4 |
| 4 | 1.5 | 1.1 | 4 | (¹) | (¹) |
| 5 | 7.2 | 2.3 | 5 | 45.3 | 34.2 |
| 6 | 3.8 | 1.5 | 6 | 14.2 | 5.4 |
| 7 | 1.2 | 0.9 | 7 | 38.4 | 30.0 |
| 8-A | 2.7 | 2.0 | 8 | 50.1 | 27.5 |
| 8-B | 1.3 | 0.9 | 9 | 13.5 | 6.4 |
| 9 | 2.5 | 1.8 | 10 | 48.4 | 31.2 |
| 10 | 0.6 | 0.5 | 11 | 24.6 | 11.8 |
| 11 | 6.5 | 2.5 | 12 | 26.5 | 18.2 |
| 12 | 3.2 | 1.3 | 13 | 18.3 | 12.5 |
| 13 | 2.6 | 1.4 | 14 | 24.6 | 16.3 |
| 14 | 5.3 | 2.0 | 15 | 10.3 | 5.8 |
| 15 | 3.8 | 1.9 | 16 | 58.8 | 30.8 |
| 16 | 0.6 | 0.8 | 17 | 60.2 | 35.3 |
| 17 | 5.6 | 2.8 | 18 | 10.6 | 8.4 |
| 18 | 1.8 | 1.2 | | | |
| 19 | 0.8 | 0.4 | | | |

¹ Not measurable, very soft (weak).

Catalysts prepared in accordance with the present invention are very suitable for use in the production of acrylonitrile, methacrylonitrile, acrolein, methacrolein, butadiene-1, 3 and the like, due to their high degree of catalytic activities as well as their high attrition resistance. In order to illustrate this the catalytic activities were determined using the following test methods:

(a) Test using a fluidized bed reactor

Into a reactor having an inside diameter of 2 inches and equipped with baffle plates serving to increase the contact efficiency, there was charged 1,600 gr. of a catalyst having a mean weight particle size of 50–70 microns. Gaseous starting materials, in case of the acrylonitrile production, for example, such as propylene, ammonia and air, were introduced at a rate of 13 cm./sec. Gaseous products were gas-chromatographed for quantitative analysis.

For each catalyst tested the optimum reaction temperature at which the maximum conversion of starting hydrocarbon to the aimed compound was obtained was determined and the conversion at that temperature is shown in Table II.

(b) Test using a microreactor

Into a U-shaped reactor having an inside diameter of 6 m/m there was charged 0.8 gr. of a catalyst having a mean weight particle size of 50–70 microns, and gaseous starting materials were fed thereinto, gaseous product being gas-chromatographed for quantitative analysis.

The test results are shown in Table II, from which it may be understood that the catalyst prepared in accordance with the instant invention has catalytic activity equal to or higher than that of a catalyst prepared according to any suitable prior art method.

TABLE II.—RESULTS OF ACTIVITY TESTS

| Catalyst | Hydrocarbon starting material | Reactant mole ratio | | | | Reaction temperature, °C. | Contact time (sec.) | Product | Conversion (percent) | Reactor |
|---|---|---|---|---|---|---|---|---|---|---|
| | | H.C | NH₃ | Air | H₂O | | | | | |
| Ex. 1 | Propylene | 1 | 1.2 | 11 | | 460 | 6 | Acrylonitrile | 66 | a |
| Ex. 2 | do | 1 | 1.2 | 11 | | 460 | 5 | do | 65 | a |
| Contr. 1 | do | 1 | 1.2 | 11 | | 460 | 5 | do | 66 | a |
| Ex. 7 | do | 1 | | 9 | 3 | 460 | 5 | Acrolein | 65 | b |
| Contr. 5 | do | 1 | | 9 | 3 | 460 | 5 | do | 64 | b |
| Ex. 1 | Butene-1 | 1 | | 6 | 1 | 420 | 10 | Butadiene-1,3 | 65 | b |
| Contr. 1 | do | 1 | | 6 | 1 | 420 | 10 | do | 62 | b |
| Ex. 17 | Toluene | 1 | 1.5 | 13 | | 430 | 8 | Benzonitrile | 60 | b |
| Ex. 18 | Propylene | 1 | 1.2 | 11 | | 460 | 5 | Acrylonitrile | 76 | a |
| Ex. 18 | Butene-1 | 1 | | 6 | | 400 | 10 | Butadiene-1,3 | 80 | b |
| Ex. 18 | Iso-butene | 1 | 1.5 | 11 | | 400 | 6 | Methacrylonitrile | 61 | a |

NOTES:
(1) a: the foregoing fluidized reactor; b: the foregoing microreactor.
(2) conversion (percent) = (weight of carbon of the aimed product) / (weight of carbon of hydrocarbon fed) × 100.

What is claimed is:

1. A process for preparing an attrition-resistant, solid catalyst containing antimony oxide, suitable for use in a fluidized bed, which comprises the steps of:
   (1) preparing a slurry containing, as essential ingredients, a pentavalent antimony compound, at least one polyvalent metal compound, and a silica sol;
   (2) adjusting the pH of said slurry to a value below about 7;
   (3) subjecting said slurry to heat treatment at a temperature of from about 40° C. to about 150° C. for at least about 20 minutes, while maintaining said slurry in a slurried state;
   (4) spray-drying the heat-treated slurry to form microspherical catalyst particles, and
   (5) calcining the resulting particles at a temperature of from about 400° C. to about 1100° C.

2. The process of claim 1 wherein the polyvalent metal compound is selected from the group consisting of iron, cobalt, nickel, tin, uranium, chromium, copper, manganese, titanium, vanadium, molybdenum, tungsten, tellurium, bismuth, arsenic, thorium and cerium.

3. The process of claim 2 wherein the polyvalent metal: antimony atomic ratio is from about 1:10 to about 5:1.

4. The process of claim 2 wherein the polyvalent metal: antimony ratio is from about 1:5 to 1:1.

5. The process of claim 1 wherein the pentavalent antimony compound is selected from the group consisting of antimony pentoxide, hydrated pentavalent antimony oxide, antimony pentahalide and pentavalent antimony oxyhalide.

6. The process of claim 1 wherein the pentavalent antimony compound is the highly oxidized antimony product obtained by repeating the addition of nitric acid to and evaporation to dryness of nitric acid-oxidized antimony product, the latter being obtained by oxidizing powdered metallic antimony with nitric acid at a temperature of from about 80° C. to about 120° C.

7. The process of claim 1 wherein the pentavalent antimony compound is the highly oxidized antimony product obtained by repeating the addition of nitric acid to and evaporation to dryness of antimony trioxide or antimony tetraoxide.

8. The process of claim 1 wherein the pentavalent antimony compound is the product obtained by treating metallic antimony, antimony trioxide or antimony tetroxide with a mixed acid consisting of hydrochloric acid and nitric acid.

9. The process of claim 1 wherein the pentavalent antimony compound used for preparing the slurry is a product obtained by oxidizing antimony trichloride or trivalent antimony oxyhalide with nitric acid.

10. The process of claim 1 wherein the silica sol is an aqueous silica sol which contains from about 5 to about 90% by weight of silica.

11. The process of claim 10 wherein said aqueous silica sol contains from about 10 to about 50% by weight of silica.

12. The process of claim 1 wherein the pH of the slurry is adjusted in step (2) to a value of from about 1 to about 4.

13. The process of claim 12 wherein the pH is adjusted with a member selected from the group consisting of nitric acid, gaseous ammonia, aqueous ammonia, and combinations thereof.

14. The process of claim 1 wherein the heat-treatment of the slurry is carried out at a temperature of from about 80° C. to about 100° C. for about 1 to 12 hours.

15. The process of claim 1 wherein the slurry just prior to said heat treatment contains from about 0.5 to about 50% by weight of solids calculated as oxides of the elements present in the slurry and which comprise the resulting catalyst.

16. The process of claim 1 wherein, prior to said heat treatment, ammonium nitrate is added to the slurry, in addition to any already present.

17. The process of claim 18 wherein the additional ammonium nitrate is added to the slurry in an amount of from about 1 to 30% based on the weight of solids in the slurry.

18. The process of claim 1 wherein the slurry after said heat treatment and prior to said spray-drying, contains from about 10 to 40% by weight of solids, calculated as oxides of the elements comprising the resulting catalyst.

19. The process of claim 1 wherein the slurry, prior to spray-drying, is subjected to homogenization.

20. The process of claim 1 wherein the calcining step is carried out in a non-reducing atmosphere.

21. The process of claim 1 wherein the calcining step is carried out in two stages, consisting of pre-calcination at a temperature of from about 350° C. to about 600° C. and final calcination at a temperature of from about 600° C. to about 1,100° C.

22. The process of claim 1 wherein at least one of the calcination stages is carried out in a fluidized bed furnace.

23. An attrition resistant catalyst produced by the process of claim 1.

24. The attrition resistant catalyst of claim 23 wherein said catalyst contains from about 10 to about 90% by weight of silica.

25. The attrition resistant catalyst of claim 23 wherein more than about 80% by weight of the catalyst particles have sizes in a range of from about 5 to 100 microns.

26. The process of claim 1, wherein the heat treatment of step (3) is at a temperature of from 80° C. to 100° C.

27. The process of claim 1, wherein the heat treatment of step (3) ranges from about one hour to about 12 hours.

References Cited

UNITED STATES PATENTS

| | | | |
|---|---|---|---|
| 3,197,419 | 7/1965 | Callahan et al. | 252—456 |
| 3,198,751 | 8/1965 | Bethell et al. | 252—456 X |
| 3,338,952 | 8/1967 | Callahan et al. | 252—456 X |
| 3,341,471 | 9/1967 | Callahan et al. | 252—456 X |
| 3,445,521 | 5/1969 | Callahan et al. | 252—456 X |
| 3,525,701 | 8/1970 | Barclay et al. | 252—454 X |

DANIEL E. WYMAN, Primary Examiner

W. J. SHINE, Assistant Examiner

U.S. Cl. X.R.

252—454, 458, 459